Nov. 22, 1966     F. L. FYSH ETAL     3,287,301
RECOVERY OF OLEFIN POLYMERS FROM SOLUTIONS THEREOF
Filed April 23, 1962
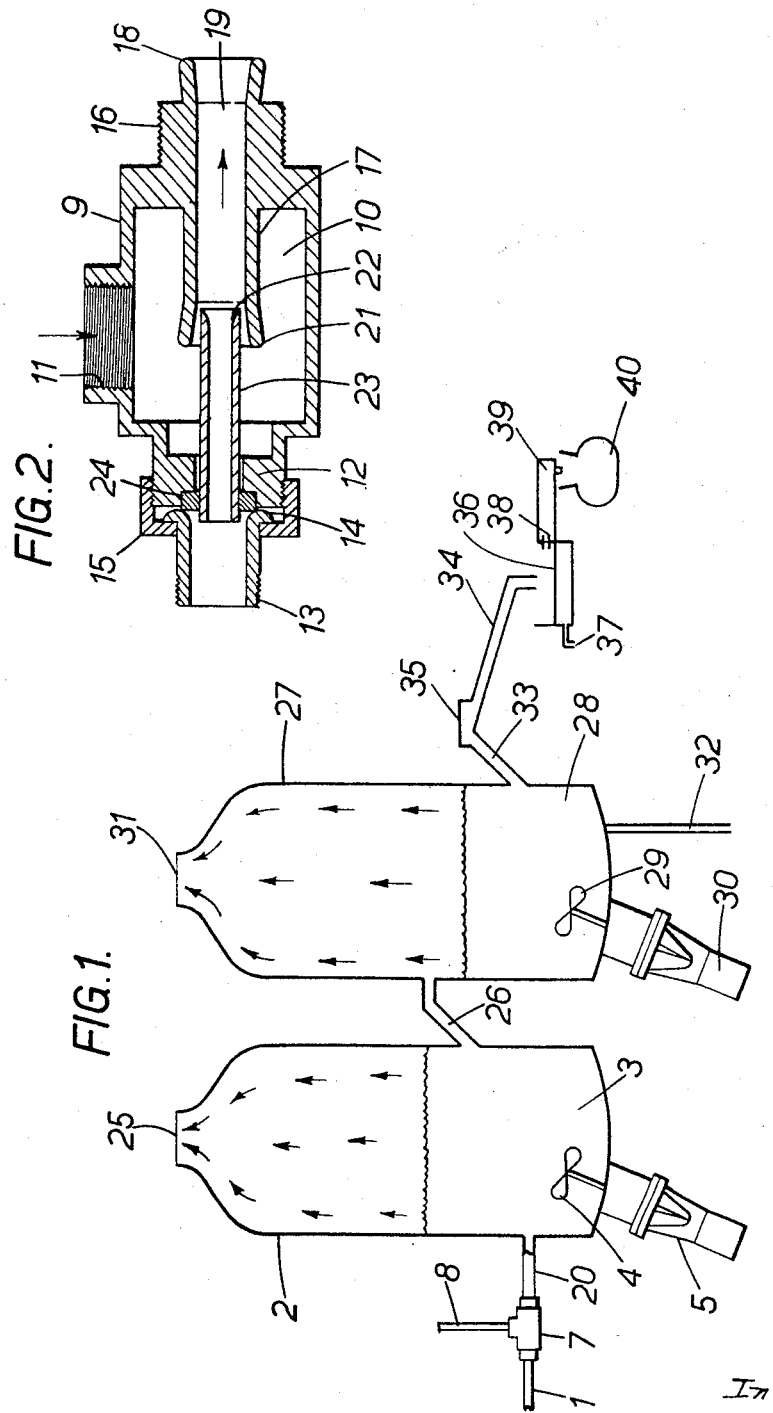
Inventors
Frederick L. Fysh
Hugh K. Coulthart
By Stevens, Davis, Miller & Mosher
Attorneys United States Patent Office 3,287,301
Patented Nov. 22, 1966

3,287,301
RECOVERY OF OLEFIN POLYMERS FROM
SOLUTIONS THEREOF
Frederick L. Fysh and Hugh K. Coulthart, Sarnia, Ontario, Canada, assignors to Polymer Corporation Limited, Sarnia, Ontario, Canada, a body corporate
Filed Apr. 23, 1962, Ser. No. 189,456
Claims priority, application Canada, Apr. 26, 1961, 822,140
12 Claims. (Cl. 260—23.7)

This invention relates to the recovery of olefin polymers from slurries thereof in aqueous media.

Solution polymerisation of olefin monomers, especially ethylene, is now well known. Various olefins such as ethylene, propylene, butylene, butadiene, isoprene, styrene, and the like can be polymerised at relatively low pressures and temperatures to produce high molecular weight polymers and copolymers using a process involving a catalyst mixture of an organo-metallic reducing agent and a reducible compound of a heavy metal. This process is usually carried out in the presence of an inert organic solvent such as butane, pentane, hexane, butene-1, butene-2, benzene, toluene, chlorobenzene and the like at temperatures between about 0° C. and 100° C. In many cases the polymer or copolymer produced remains in solution in the organic solvent within which the polymerisation is carried out. Such a solution is highly viscous and is often referred to as a "cement."

The reducing agents which are employed in the catalyst are organo-metallic compounds of metals of Groups I, II and III of the Periodic System, the most commonly used being those of Group III of the Periodic System, including various aluminum trialkyls such as aluminum trimethyl, aluminum triethyl, aluminum tripropyl and higher aluminum trialkyls, as well as dialkyl aluminum monohalides, monoalkyl aluminum dihalides and dialkyl aluminum hydrides. Although aluminum is the preferred metallic component of the reducing agent, it may be substituted by other metals of Group III such as gallium, indium, or thallium, as well as by the metals of Groups I and II. The reducible heavy metal compounds which are generally used are salts of heavy metals, those of the heavy metals of Groups IVB, VB, VIB, and VIII and particularly of titanium, zirconium, vanadium, uranium, thorium, chromium, iron, nickel and cobalt being preferred. The salts of the heavy metals which may be used include halides, complex halides, oxyhalides, alkoxides, acetates, acetyl acetonates and the like.

Certain olefinic compounds can also be polymerised using alkali metals and organo-compounds of such metals without the heavy metal compounds of the above-described catalyst systems. For example, butadiene and isoprene can be polymerised using metallic sodium as well as organo-compounds of alkali metals such as sodium butyl, sodium benzyl and the like.

Considerable interest has recently been shown in the production of stereospecific polymers of conjugated dienes, especially 1,3-dienes such as 1,3-isoprene or 1,3-butadiene. Polymers of 1,3-dienes can exist in a cis-1,4, trans-1,4- or 1,2-configuration (and in the case of substituted polybutadienes in 3,4-) and the polymerisation of butadiene or isoprene using one of the catalysts mentioned above generally results in a polymer which is a mixture of the various possible configurations.

The stereochemical configuration of a diene polymer has a profound effect on its physical properties as evidenced by the difference between natural rubber and gutta percha. Natural rubber is a poly-isoprene having substantially entirely the cis-configuration whereas gutta percha is a polyisoprene of substantially entirely trans-configuration. It has long been desired to make a synthetic rubber having physical properties similary to those of natural rubber but the polymerisation of dienes with the aid of the catalysts mentioned above has failed to yield such a synthetic rubber because the polymers obtained did not have the proper steretochemical configuration, i.e., instead of being substantially entirely in the cis-configuration they were mixtures of the cis- and trans-configurations.

Recent work has shown however that some catalyst are capable of causing polymerisation of isoprene or butadiene to give a stereospecific product which is predominantly of cis- or of trans-configuration. Thus, it has been discovered that an iodine-containing catalyst which includes an organo-metallic reducing agent and a reducible compound of titanium, effects polymerisation of butadiene to give a polybutadiene which is mainly of cis-configuration; the organo-metallic reducing agent may, for example be an aluminum trialkyl in which the alkyl contains from one to six carbon atoms. Also, catalysts consisting of mixtures of salts of Group VIII metals, especially cobalt salts, with alkyl aluminum halides have been used with considerable success in the production of cis-polymers of butadiene. Cis-polymers of isoprene, but not of butadiene, may on the other hand be obtained with the aid of lithium, or a lithium alkyl such as lithium butyl, as a catalyst. The present invention is particularly, though not exclusively concerned with the recovery of these stereospecific polymers of 1,3-dienes from reaction mixtures produced by solution polymerisation procedures.

The solution polymerisation of an olefin, for example a conjugated diene, involving the use of an inert organic solvent, such as a hydrocarbon, and a catalyst of one of the types mentioned above may yield a reaction mixture which consists of a solution of the polymer in the solvent, this solution having catalyst residues dispersed therein. The treatment of such reaction mixtures for the recovery of the polymer presents considerable difficulties.

It is possible to recover an olefin polymer from a solution in an inert organic solvent by bringing said solution into intimate contact with a hot aqueous medium to effect volatilisation of said solvent and formation of solid crumbs of said polymer. In some cases it is possible to use hot water, preferably at a temperature above 150° F. as the hot aqueous medium. However with some polymers, particularly polymers of 1,3-dienes, the use of hot water does not give entirely satisfactory results. It is preferable for the recovery of all olefin polymers, and of polymers of 1,3-dienes in particular, to utilize steam as the hot aqueous medium. Subsequent to the contacting of the solution with steam it is desirable to bring the crumbs of polymer, which are thereby formed, into contact with hot water under conditions of vigorous agitation to promote further removal of solvent from the crumbs.

Although many techniques can be employed for bringing the solution into intimate contact with steam, it has been found that high efficiency of solvent removal with ready control of the size of the crumbs of polymer obtained can best be achieved by forming the solution into a jet and contacting this jet with a jet of steam. Furthermore, it is preferable that the jet of steam be in the form of an annular envelope surrounding the jet of the solution. In practice this can be effected by expelling high pressure steam through an annular orifice surrounding an orifice through which the jet of solution is forced partly by means of pressure exerted on the solution and partly due to the suction exerted by an annular jet of stream. Rapid mixing of the steam and the solution takes place in the turbulent region immediately beyond the orifices from which the jets of steam and solution emerge. The mixture of steam, polymer solution, polymer crumbs, volatilized solvent and water produced by the mixing of the jets is then advantageously passed into a bath of hot water maintained at a temperature of above 150° F. This bath is continuously maintained under vigorous agitation so as to ensure thorough stripping of the solvent from the polymer crumbs.

Preferably, the mixture is introduced into the bath of hot water below the surface of the bath. This has the effect of setting up a region of high turbulence at the point of entry of the mixture with the result that the majority of the solvent vapours are immediately expelled upwardly from the bath. Upon entering the bath each crumb of polymer still contains an undesirably high proportion of solvent and it is therefore necessary to hold the crumb in the vigorously agitated bath for a time which is sufficient to reduce the solvent content of the crumb to a satisfactorily low value. The length of this time depends on the nature of the solvent and of the polymer and on the operating characteristics generally. Residence times of the order of from 2 to 15 minutes are commonly required. Removal of a slurry of polymer crumbs from the bath, preferably at the lower end thereof, is regulated to adjust the residence time of the crumbs in the bath to a suitable value.

In many cases it is found that the polymer crumbs contained in the aqueous slurry so produced have a solvent content sufficiently low that the crumbs can immediately be separated and dried to yield a product of satisfactorily low solvent content. Sometimes however it is desirable to arrange that this slurry of crumbs is introduced into a second aqueous bath maintained at a temperature similar to that of the first bath. Additional stripping of solvent from the polymer crumbs takes place in the second bath to yield a product of lower solvent content than is obtainable merely by prolonging the residence time of the crumbs in the first bath. If desired, several series-connected baths may be employed, each of them discharging an aqueous slurry of polymer crumbs into the subsequent bath.

The aqueous slurry of the polymer crumbs which is withdrawn from the last bath is treated for removal of the majority of the water, as by passing it over a filter screen, and is then dried by means of suitable drying apparatus such as an extrusion drier or a Banbury drier. Oven drying may also be used where the physical properties of the polymer permit.

It is found that the method described makes it possible to obtain, in an economical manner, dry, porous crumbs of olefin polymers having a low solvent content. Furthermore the method permits the ready incorporation into the polymers of various additives such as anti-tack agents and antioxidants. Addition of such materials to the polymer can be effected at various stages. They can for example be added to the original solution of the polymer in the organic solvent, to the hot aqueous bath or to the slurry of polymer crumbs withdrawn from the bath.

In the solution polymerisation of olefinic monomers using the catalysts referred to above the polymerisation reaction is arrested, when a sufficient degree of polymerisation has been achieved, by adding a stopping agent to the reaction mixture. This stopping agent may be almost any compound containing an active hydrogen, for example water, an alcohol, e.g., isopropanol, an amine, e.g., triethylamine, or an organic or inorganic acid, e.g., acetic acid or sulphuric acid. It reacts with the catalyst to deactivate it and thereby terminates the polymerisation reaction. The final reaction mixture thus contains not only the polymer and the solvent, together with small amounts of unreacted monomer, but also catalyst residues. These residues have in the past generally been separated before further treatment of the reaction mixture since they may seriously interfere with the known procedures for recovering the polymer from the mixture. The method described is however applicable to the recovery of olefin polymers from solutions still containing catalyst residues as well as from solutions freed from catalyst residues. Indeed the method described can actually render unnecessary the provision of a separate step of adding a stopping agent to the reaction mixture. If desired, the reaction mixture can be withdrawn from the reactor after a sufficient degree of polymerisation has been achieved and be brought directly into contact with steam. The steam then serves not only to volatilise the solvent but also to kill the catalyst.

The inert solvents generally employed in the solution polymerisation of olefins are aromatic or aliphatic hydrocarbons such as benzene, toluene, butane, pentane, hexane, butene-1, butene-2, cyclohexane and the like or refinery cuts consisting of mixtures of these solvents. Chlorinated hydrocarbons, for example carbon tetrachloride, trichloroethylene and chlorobenzene, may also be utilised. The method described is best applied to the recovery of olefin polymers from solutions in solvents having a boiling point lower than that of water. Most of the aforementioned type of solvents do have a lower boiling point than water and the recovery of olefin polymers from solutions therein is readily achieved according to the invention. However it is also possible in some cases to use solvents having boiling points marginally higher than that of water and in particular to use solvent mixtures having a boiling range the upper limit of which is above the boiling point of water. The feasibility of this depends on vapour pressure relationships and the possible formation of azeotropes. In general it may be said that the method described is applicable to the recovery of olefin polymers from any non-reactive organic liquid having an appropriate boiling range in the presence of excess water.

The present invention is concerned with improving the quality of olefin polymers recovered from a slurry of crumbs of polymer in an aqueous medium.

The invention provides in a method of recovering solid crumbs of an olefin polymer from a slurry of said crumbs in an aqueous medium, the step of introducing into said polymer a minor proportion of a mixture of a rosin acid and a fatty acid whereby to improve the resistance of said polymer to discoloration on aging while maintaining a desired average size of said crumbs. The rosin acid may for example be pimaric acid, abietic acid or an isomer thereof. The fatty acid is preferably one having from 18 to 20 carbon atoms, for example oleic acid or linoleic acid.

It has been found that both the rosin acid and the fatty acid promote good colour characteristics in the polymer produced and minimise the tendency of the product to darken upon aging. However the use either of rosin acid alone or fatty acid alone to control the colour properties of the product is complicated by the fact that each of them has a pronounced effect on the tendency of the polymer crumbs to agglomerate. The rosin acid is an agglomerant while the fatty acid is an anti-agglomerant.

Many polymers agglomerate too much or too little so that the addition of an agglomeration control agent is desirable for its own sake. Since rosin acids and fatty acids have been found to improve the colour characteristics it is clearly desirable that where agglomeration control is necessary it should be effected by adding a fatty acid or a rosin acid as may be appropriate. The degree of agglomeration exhibited by the polymer crumbs is dependent on the Mooney value of the polymer. With a lower Mooney value, for example 25 Mooney (ML-4), there is a higher tendency for agglomeration so that fatty acid should be added to reduce agglomeration. Conversely, with a higher Mooney value there is a lower tendency for agglomeration so rosin acid should be added to promote agglomeration. In extreme cases the proportion of fatty acid or rosin acid which has to be added to give a polymer crumb of desired size is sufficiently great to endow the product with the desired colour stability. However at intermediate Mooney values the proportion of fatty acid or rosin acid that has to be incorporated to yield the desired crumb size is frequently less than that required to impart the desired colour characteristics. If the proportion of fatty acid or rosin acid is increased in such a case for the purpose of improving the colour characteristics the crumb size is adversely affected since an undesired lack or excess of agglomeration, as the case may be, is induced. In other words a choice has to be made between impairment of colour properties due to use of an inadequate amount of rosin acid or fatty acid and the production of crumbs of a size larger or smaller than the optimum size. This problem is encountered most strikingly in the case of polymers which, within a certain range of Mooney values, will readily yield crumbs of a desired size without the addition of either a rosin acid or a fatty acid. In such a case it is desired to leave unaltered the capacity of the crumbs to agglomerate but the inclusion of additives serving to improve the colour characteristics is still desirable.

It has been found that this difficulty is overcome by adding to the system a mixture of at least one rosin acid and at least one fatty acid as described above. The mixture may be added at any convenient stage. Thus, when applying the present invention to the treatment of polymer crumbs in a slurry produced by bringing a solution of the polymer in an organic solvent into contact with a hot aqueous medium, the mixture may be added to the aqueous bath or alternatively introduced directly into the solution of the polymer prior to the contacting of this solution with the steam or other hot aqueous medium. When working with a polymer which has a low Mooney value and a high tendency to agglomerate the proportion of fatty acid in the mixture is increased and the proportion of rosin acid decreased whereas the reverse is the case when working with a polymer of high Mooney value which has a low tendency to agglomerate. A relatively small proportion of the mixture of rosin acid and fatty acid is needed to improve the colour characteristics. The actual amount depends on the nature of the polymer but is generally of the order of up to 1% of the weight of the dry product produced, the preferred range being from about 0.2 to about 0.6%. In extreme cases, it may be desirable to add more of the rosin acid or the fatty acid, so as to control the crumb size, than is required to improve the resistance to discoloration or aging. A small excess of either acid does not exercise any serious detrimental effects. In the case of polymers in respect of which the addition of from 0.2 to 0.6% of the mixture of rosin acids and fatty acids imparts the desired colour stability it has been found that for a 40 to 65 Mooney polymer excellent results are achieved both as to crumb size and colour characteristics by using a mixture of fatty acids commercially available under the registered trade mark Pamak 25A. The latter product is a mixture containing 25% rosin acids (pimaric acid, abietic acid, and isomers of abietic acid) 72% of acids having 18 carbon atoms (oleic and linoleic) and about 1% of other materials including dicarboxylated rosin acids, palmitic acid, stearic acid and hydrocarbons.

It will be appreciated that the use of a mixture for controlling the aging properties of an olefinic polymer obtained from a finishing process in which crumbs of the polymer are suspended in an aqueous medium may be practised quite generally irrespective of whether or not the polymer crumbs have been produced by bringing a solution of the polymer in an organic solvent into contact with a hot aqueous medium.

It is evident that the amounts of the mixture of rosin acid and fatty acid must be selected in accordance with the other operating variables to give a product of a crumb size large enough to facilitate removal of the water from the crumbs. Subject to this limitation the crumb size should be as small as possible so that is has the maximum feasible surface to volume ratio. This facilitates removal from the crumbs of organic solvent and unreacted monomer. In general, crumbs of from about ⅛ to ¼ inches are convenient to handle.

As mentioned above it is possible to form an aqueous slurry of polymer crumbs by bringing the polymer solution into contact with steam and introducing the resulting mixture into a bath of hot water. This bath is advantageously maintained, according to the present invention, at a pH above 7, preferably above 7.5, by introduction of an alkaline reagent which may be a base, for example sodium or potassium hydroxide, but is preferably a buffer, for example sodium carbonate, sodium bicarbonate, sodium borate, sodium hydrogen phosphate and trisodium phosphate. The alkaline reagent may be added to the system at any convenient stage. For example the stopping agent may consist of an aqueous solution of a buffer such as trisodium phosphate. Alternatively the alkaline reagent may be added directly to the aqueous bath.

The presence of the alkaline reagent in the aqueous bath prevents the bath from becoming acidic due to the solution therein of acids formed by reaction between the catalyst and the stopping agent. For example when using a catalyst containing titanium tetraiodide the inactivation of the catalyst results in the formation of hydrogen iodide. Apart from avoiding any physical deterioration of the polymer that might in some cases be caused by the presence of free acid, the use of an alkaline aqueous bath avoids corrosion problems resulting from attack of the acid on the equipment employed. For example it has been found that when using iron equipment the polymer product is reddish in colour if the aqueous bath is allowed to attain pH 5. The amount of alkaline reagent added depends on the operating conditions but is regulated to be sufficient to maintain the pH above 7.0, preferably above 7.5.

The aqueous bath may, if desired, be maintained under superatmospheric pressure. This can be advantageous when a low-boiling solvent, for example butene-1, is employed. Also the use of superatmospheric pressure facilitates the condensation, as a liquid, of unreacted monomer rising from the aqueous bath. Condensation of monomers such as butadiene at atmospheric pressure requires a high degree of cooling. However, operation at atmospheric pressure is feasible in many cases.

The invention will be described by way of illustration and without limitation with reference to the accompanying drawings wherein, FIG. 1 is a flow sheet schematically illustrating a method of recovering an olefin polymer from a solution thereof in a hydrocarbon solvent, and FIG. 2 shows in detail an ejector utilised in the method illustrated in FIG. 1.

A solution of an olefin polymer in an inert solvent is fed through line 1 to a flash tank 2 within which an aqueous bath 3 is maintained under agitation by means of a propeller agitator 4 driven by a motor 5. The whole of the bath 3 is in a state of continuous turbulence as indicated in FIG. 1 by the broken nature of the surface 6 of the bath.

Before reaching the flash tank 2 the solution of the polymer passes through an ejector 7 to which high pressure steam is also passed by way of a line 8. As shown in FIG. 2 the ejector 7 is somewhat similar in construction to a conventional type of steam ejector. The ejector 7 comprises a body member 9 which encloses a chamber 10 and is provided with an internally threaded connection 11 to which the line 8 is connected and an externally threaded connection 12 to which a pipe connection 13, provided at one end with an annular flange 14, is secured with the aid of an apertured screw cap 15. At its other end the pipe connection 13 is externally threaded for connection thereto of the line 1. The body member 9 also includes an externally threaded apertured connection 16. The connection 16 is formed with an annular wall 17 projecting into the chamber 10. The wall 17 cooperates with the aperture in the connection 16 and with a second, shorter annular wall 18, projecting outwardly from the connection 16, to form a throat 19 through which steam and the solution of the polymer are ejected into a line 20 leading to the flash tank 2. The annular wall 17 is formed at the end thereof within the chamber 10 with a flared portion 21 into which projects the slightly tapered tip 22 of a nozzle 23. The nozzle 23 is mounted at the end thereof remote from the tip 22 in a sealing ring 24 held in place by the annular flange 14 on the pipe connection 13.

The pressure at which the polymer solution is supplied from the line 1 to the nozzle 23 and the pressure at which the steam is supplied from the line 8 to the interior of the chamber 10 depends on the operating variables including the nature of the polymer solution and the dimensions of the equipment. Thus, the dimensions of the connections 11 and 13 the throat 19 and the nozzle 23 materially affect the operating pressures which are feasible. The greater these dimensions the smaller the pressures can be. In two ejectors which have been used in carrying out the method of the invention these dimensions were as follows:

|  | Ejector Y, inches | Ejector Z, inch |
| --- | --- | --- |
| Connection 11 | 2 | 1 |
| Connection 13 | 1¼ | ¾ |
| Connection 16 | 2 | 1 |
| Nozzle 23 | ⅜ | ¼ |

When using ejector Y the steam and the solution of polymer were supplied at lower pressures than when using ejector Z. The ratio of the pressures may be varied in whatever manner is found to be desirable to give a satisfactory crumb of polymer. Generally it is found that adjustment of the pressures to give steam to polymer solution flow ratios of 0.4 to 0.6 is desirable. Higher ratios may be of value for the purpose of maintaining the bath 3 at an appropriate temperature but this can usually be more economically achieved by injecting low pressure steam directly into the bath 3.

The passage of the steam from the chamber 10 to the throat 19 exerts suction on the solution of polymer emerging from the nozzle 23. The result is that the solution of the polymer is entrained by a fast moving envelope of steam completely surrounding the solution of the polymer. Intimate mixture of the steam and the solution of polymer is therefore initiated shortly after the two enter the throat 19. Since the line 20 is short in length, generally about 2 feet, the mixing operation is however not always absolutely complete by the time that the materials have reached the end of the line 20 to enter the flash tank 2 although considerable mixing has taken place by that time with volatilisation of most of the solvent and formation of crumbs of the polymer.

Upon entering the flash tank 2 the mixture enters an environment of great turbulence caused primarily by the injection of the mixture into the bath 3 and partly by the agitator 4. Accordingly the intimate mixing of the steam and the solution of polymer is completed within a very short time after the materials enter the bath 3 if this has not already occurred in the line 20.

The majority of the inert solvent within which the polymer is dissolved is volatilised very quickly in the line 20 or immediately after the solution has entered the bath 3 and rises upwardly from the bath as indicated by arrows in FIG. 1. The rising solvent vapours pass through an outlet 25 and are passed into a condenser from which is withdrawn a mixture of condensed solvent, unreacted monomer and water. This mixture may then be treated in a suitable separation tank for recovery of the solvent; the hot water drawn from the separation tank may if desired be fed to the bath 3 for maintaining the temperature of the bath in which task it may be assisted by the injection of low pressure steam into the bath.

Not all of the solvent is removed from the polymer in the line 20 or upon the entry of the mixture into the bath 3. The removal of most of the solvent immediately after such entry yields crumbs of the polymer which still contain an unacceptably high proportion of solvent. However, these crumbs are subjected to the vigorous action of the bath 3 and a comparatively short residence time of the crumbs in the bath 3 serves to strip most of the solvent from the crumbs. The residence time required depends on the nature of the polymer and of the solvent and also on the characteristics of the various elements of apparatus utilised. In the case of a cis- polybutadiene polymer recovered from a solution thereof in Iosol–1520 the residence time may for example be of the order of 6 minutes. The turbulence in the bath 3 serves to ensure that the crumbs of polymer remain with the bath for the required time and are subjected to the necessary stripping action. Thus the bath 3 consists of an aqueous slurry of crumbs of polymer of low solvent content.

This slurry is withdrawn from the flash tank 2 by way of an outlet 26 and passed into a second flash tank 27 generally similar to the flash tank 2. The flash tank 27 contains a hot aqueous bath 28 maintained under agitation by means of a propeller agitator 29 driven by an electric motor 30. The purpose of the flash tank 27 is to effect further stripping of solvent from the polymer crumbs. The solvent leaves the flash tank 27 by way of an outlet 31 and is passed to a suitable condenser. In some cases adequate removal of solvent is achieved in the flash tank 2 and the flash tank 27 can be dispensed with. However, where the use of the flash tank 27 is found to be necessary for obtaining a satisfactory solvent-free product, it is found that the provision of the flash tank 27 is not a mere equivalent of increasing the residence time of the polymer crumbs in the flash tank 2. For example, when recovering cis-1,4-polybutadiene from a solution in benzene it is found that quite a prolonged increase of the residence time in the flash tank 2 is incapable of stripping the benzene from the polymer crumbs with the efficiency that can be achieved employing a combination of the flash tanks 2 and 27 and a relatively short residence time in each of the tanks. In general the residence time of the polymer crumbs in the flash tank 27 is of the same order as that in the flash tank 2 and the temperautre of the bath 28 is similar to that of the bath 3. To maintain the bath 28 at the desired temperature low pressure steam is injected into the bath through a line 32.

An aqueous slurry of polymer crumbs is withdrawn from the flash tank 27 through an outlet 33 and passed to the top of an inclined trough 34 having an open upper end 35. Additives which it is desired to incorporate in the polymer crumbs may be introduced through the open end 35 of the trough. From the lower end of the trough 34 the polymer slurry is discharged on to a vibrating screen 36. The liquid portion of the slurry passes through the screen 36 and is carried away through an outlet 37 to waste or preferably is returned, after any necessary purification treatment, to the flash tank 2 so as to maintain the volume of the bath 3. The crumbs of polymers retained by the screen 36 are discharged through an opening 38 into a hopper 39 from which they are fed to an extrusion drier 40 in which the water is removed together with traces of solvent. From the drier 40 emerges substantially solvent-free, dry polymer.

The arrangement shown in FIGURES 1 and 2 is susceptible to many variations. For example, instead of feeding the solution of polymer through the line 1 and the steam through the line 8, the solution may pass through the line 8 and the steam through the line 1. However it has been found preferable to adopt the expedient of surrounding a jet of the solution with an envelope of steam rather than the other way round. For some reason this facilitates the obtaining of polymer crumbs of a desired size and also the stripping of the solvent from the crumbs.

Furthermore it is feasible to have the line 20 entering the flash tank 2 at a level above, rather than below, the surface 6 of the bath 3. Here again however it has been found that better control of crumb size and a more efficient stripping of the solvent from the crumbs is achieved when the steam and the solution of polymer are introduced into the flash tank 2 below the surface of the bath 3.

By way of specific example of the application of the method of the invention to the recovery of an olefin polymer from a solution thereof in an inert solvent a description will now be given of the use of the arrangement of FIGS. 1 and 2 for recovering cis-1,4-polybutadiene from a polymerisation mixture.

The feed to the line 1 consisted of a solution obtained by polymerisation of 1,3-butadiene in an organic solvent. The solvent used in the specific examples herein described was toluene, benzene or a solvent sold under the trade mark Iosol–1520 which is a refinery cut of aliphatic and cycloaliphatic hydrocarbons containing a small proportion of aromatic hydrocarbons consisting mainly of n-hexane, 2-methyl pentane, phenylethyl pentane, cyclohexane and methyl cyclohexane and has a boiling point of 150–200° F. The polymerisation was carried out in the presence of a catalyst consisting of a mixture of titanium tetraiodide and aluminum triisobutyl and was terminated by admixing with the reaction mixture an aqueous solution of trisodium phosphate (TSP). The trisodium phosphate was included for the purpose of taking up hydrogen iodide liberated by reaction of the titanium tetraiodide with the added water and thereby controlling the pH of the baths 3 and 28 to maintain the pH of these baths at a value above 7. Thus, the feed to the line 1 included not only solvent and cis-1,4-polybutadiene dissolved therein but also catalyst residues, water and trisodium phosphate dispersed in the solvent.

The temperature of the bath 3 was maintained, with injection of low pressure steam when necessary, at from 150–205° F. A similar temperature was maintained in the flash tank 27 when this was utilised. Both the flash tank 2 and, when used, the flash tank 27 were operated under atmospheric pressure. It will be noted that the temperature did not necessarily exceed the boiling point or the upper limit of the boiling range of the solvent contained in the feed; however this did not prevent satisfactory stripping of the solvent from the polymer crumbs. In general it is desirable to operate with a solvent that has a boiling point below that of the operating temperature in the flash tank or flash tanks but this is not essential and indeed it is possible in some cases to use a solvent having a boiling point above that of water since some solvents are sufficiently volatile below their boiling points to be vaporised when introduced into a relatively large and turbulent body of hot water.

In the operation of the arrangement of FIG. 1 for recovering cis-1,4-polybutadiene the concentration of the polymer in the baths 3 and 28 was controlled, by regulating the rate of withdrawal of slurry from the outlet 26, so as to be maintained below 2% by weight. The rate of withdrawal of the slurry from the outlet 26 was regulated by the rate at which liquid drawn from the outlet 37 of the screen 36 was recycled to the flash tank 2.

It was found that with the above operational values crumbs of cis-1,4-polybutadiene of diameter in a range of from ⅛ inch to ¼ inch were delivered to the hopper 39 and that after passage through the extrusion drier 40 the polymer was from 98 to 99.9% solvent-free depending on the particular operating conditions.

In order to prevent build-up of catalyst residues and trisodium phosphate in the baths 3 and 28 the volume of the bath was maintained only partially by recycling thereto the liquid discharged from the outlet 37 of the screen 36. The balance of the make-up water needed was supplied by condensation of low pressure steam introduced into the bath 3 (and the bath 28 when this was utilised) for the purpose of maintaining its temperature.

The following tables set out the results of a number of runs in which cis-1,4-polybutadiene was recovered from a solution thereof in an organic solvent by the method described above. The runs of Table I were carried out using aforementioned ejector Y and the runs of Table II using aforementioned ejector Z.

TABLE I

| Run | A | B | C | D |
|---|---|---|---|---|
| Solvent | Iosol–1520 | Iosol–1520 | Iosol–1520 | Iosol–1520 |
| Polymer Solution: | | | | |
| Solids, percent | 19.1 | 12.6 | 17.1 | 17.6 |
| Flow rate, lbs./hr | 604 | 534 | 480 | 558 |
| Pressure at ejector, p.s.i.g | 53 | 50 | 50 | 64 |
| TSP added | 2 | 2 | 2 | 2 |
| Antioxidant added | 1.25 | 1.25 | 1.25 | 1.25 |
| Agglomeration: | | | | |
| Control agent | (1) | (2) | (1) | (1) |
| Amount added | 1.5 | .4 | 1.5 | 1.5 |
| Steam: Flow rate, lbs./hr | 355 | 288 | 200 | 335 |
| Steam: Pressure at ejector, p.s.i.g | 48 | 80 | 56 | 66 |
| Steam: Cement wt. flow ratio | .59 | .54 | .42 | .60 |
| Flash tank 2: | | | | |
| Water temp | 189 | 193 | 185 | 192 |
| Water pH | 7.8 | 9.5 | 9.0 | 9.3 |
| Discharge slurry conc., percent | 1.6 | 1.27 | 1.2 | 2.0 |
| Wet crumb, percent volatile hydrocarbon based on dry rubber content | 2.4 | 2.5 | 3.41 | 2.7 |
| Flash tank 27: Water temp. °F | | | | |
| Wet crumb, percent volatile hydrocarbon based on dry rubber content | | | | |
| Dry Product: | | | | |
| Percent volatiles | 0.19 | 0.34 | 0.5 | Nil |
| Percent volatile hydrocabron | (3) | (3) | (3) | Nil |
| ML–4 | 46 | 48.5 | 44.5 | 20 |
| Residence time in flash tank—Flash tank volume, gals.: Recirculation water flow, g.p.m. | 6.0 min. | 5.75 min. | 6.0 min. | 10 min. |

1 Zn Stearate.
2 Pamak 25A.
3 Not recorded.

TABLE II

| Run | E | F | G |
|---|---|---|---|
| Solvent | Iosol-1520 | Toluene | Benzene |
| Polymer Solution: | | | |
|   Solids, percent | 14.5 | 12.0 | 12.3 |
|   Flow rate, lbs./hr | 538 | 666 | 800 |
|   Pressure at ejector, p.s.i.g | [1] 146 | [1] 122 | ([2]) |
| TSP added | 2 | 2 | 2 |
| Antioxidant added | 1.25 | 1.25 | 1.25 |
| Agglomeration: | | | |
|   Control agent | ([3]) | ([3]) | ([3]) |
|   Amount added | .4 | .4 | .4 |
| Steam: Flow rate, lbs./hr | 475 | 455 | 575 |
| Steam: Pressure at ejector, p.s.i.g | 148 | 140 | ([2]) |
| Steam: Cement wt. flow ratio | .88 | .68 | .72 |
| Flash tank 2: | | | |
|   Water temp | 188 | 202 | 200 |
|   Water pH | 7.0 | 7.0 | 7.0 |
| Discharge slurry conc., percent | 0.9 | 0.83 | |
| Wet crumb, percent volatile hydrocarbon based on dry rubber content | 3.7 | 3.85 | 1.93 |
| Flash tank 27: Water temp. °F | | 199 | 197 |
| Wet crumb, percent volatile hydrocarbon based on dry rubber content | | 3.16 | 0.95 |
| Dry Product: | | | |
|   Percent volatiles | 0.29 | 1.3 | ([2]) |
|   Percent volatile hydrocarbon | ([2]) | 0.22 | 0.35 |
|   ML-4 | 42 | 47.5 | ([2]) |
| Residence time in flash tank—Flash tank volume, gals.: Recirculation water flow, g.p.m | 3.5 min. | [4] .32 min. | ([2]) |

[1] At pump.
[2] Not recorded.
[3] Pamak 25A.
[4] Min. per tank.

In runs A, B, C, D and E the flash tank 27 was not employed. Trisodium phosphate (TSP) is given as the number of parts thereof per parts of titanium tetraiodide. The antioxidant was a product sold under the trade mark Deenax (which consists of a hydrocarbon solution of p-di-tert-butyl cresol, and the amount added is given as the number of parts thereof per 100 parts of dry polymer obtained. The amount of agglomeration-control agent added is also given as the number of parts thereof per 100 parts of dry polymer.

A criterion of the effectiveness of the agglomeration-control agents was the proportion of fines passing through the screen 36. In runs B, E, F and G where Pamak 25A was added the proportion of fines was inconsiderable. In runs A and C, where zinc stearate was added a significant proportion of fines were produced. It will be observed that all of runs A, B, C, E, F and G involved a product of Mooney (ML-4) within the range of 40 to 50; as previously mentioned the ratio of rosin acid to fatty acid in Pamak 25A is such as to make this material suitable for controlling crumb size of products of this Mooney while imparting colour stability to them. Run D differs from the others in that it involves a product of lower Mooney, namely an ML-4 value of 20, and in the case of this product the amount of zinc stearate added gave an inconsiderable proportion of fines by contrast with runs A and C where a similar amount of zinc stearate was used on a higher Mooney product. In the runs where Pamak 25A was added this was introduced into the polymer solution before the solution contacted the steam. In the other runs the zinc stearate was added to the aqueous bath 3.

Although the process has been described with special reference to the treatment of an aqueous slurry of a polybutadiene it is also applicable to the treatment of aqueous slurries of other olefin polymers, for example, polyisoprenes, polyethylenes, polypropylenes and copolymers of ethylene and propylene.

The embodiments of the invention in which an exclusive property or privilege is claimed are defined as follows:

1. In a method of recovering solid crumbs of an olefin polymer from a slurry of said crumbs in an aqueous medium, the steps of introducing into a solution of said polymer in an inert organic solvent a minor proportion up to about 1% by weight of the resultant dry polymer product of a mixture of a rosin acid selected from the group consisting of pimaric acid, abietic acid, isomers of abietic acid and mixtures thereof and a fatty acid having from 18 to 20 carbon atoms the said proportion of said mixture introduced being selected to improve the resistance of said polymer to discoloration on aging while maintaining a desired average size of said crumbs, and subsequently rapidly mixing the solution with a hot aqueous medium to effect volatilisation of the organic solvent and formation of the said slurry.

2. In a method of recovering solid crumbs of an olefin polymer from a slurry of said crumbs in an aqueous medium, the steps of introducing into a solution of said polymer in an inert organic solvent a minor proportion up to about 1% by weight of the resultant dry polymer product of a mixture of a rosin acid selected from the group consisting of pimaric acid, abietic acid, isomers of abietic acid and mixtures thereof and a fatty acid having from 18 to 20 carbon atoms, the relative proportions of rosin acid and fatty acid in said mixture being selected to maintain a desired average size of said crumbs and said minor proportion of said mixture being sufficient to improve the resistance of said polymer to discoloration on aging, and subsequently rapidly mixing the solution with a hot aqueous medium to effect volatilisation of the organic solvent and formation of the said slurry.

3. A method according to claim 2 wherein said mixture is introduced into a solution of said polymer in an inert organic solvent and said solution is then brought into contact with a hot aqueous medium to form crumbs of said polymer.

4. A method according to claim 2 wherein said mixture is added to said aqueous medium.

5. A method according to claim 2 wherein the amount of said mixture introduced is from 0.2 to 0.6% by weight of the polymer.

6. A method according to claim 2 wherein said olefin polymer is selected from the group consisting of polymers of 1,3-dienes and copolymers of ethylene and propylene.

7. A method according to claim 2 wherein said polymer is cis-1, 4-polybutadiene.

8. A method according to claim 2 wherein the pH of said aqueous medium is maintained above pH 7.

9. A method according to claim 8 wherein said pH is maintained above pH 7 by addition of a buffer.

10. A method according to claim 2 wherein said olefin polymer has been produced by solution polymerisation of an olefin in the presence of an iodine-containing catalyst comprising an organo-metallic reducing agent and a reducible compound of titanium.

11. In a method of recovering solid crumbs of an olefin polymer from a slurry of said crumbs in an aqueous medium, the steps of introducing into a solution of said polymer in an inert organic solvent a minor proportion, up to about 1% by weight of the resultant dry polymer product, of a mixture of a rosin acid selected from the group consisting of pimaric acid, abietic acid, isomers of abietic acid and mixtures thereof, and a fatty acid, having about 18 carbon atoms, whereby to improve the resistance to discoloration on aging, the relative proportions of the rosin acid and the fatty acid in said mixture being selected to maintain an average size of said crumbs between about 1/8 inch and about 1/4 inch, and subsequently rapidly mixing the solution with a hot aqueous medium to effect volatilisation of the organic solvent and formation of the said slurry.

12. In a method of recovering solid crumbs of an olefin polymer from a slurry of said crumbs in an aqueous medium, the steps of introducing into a solution of said polymer in an inert organic solvent a minor proportion, up to about 1% by weight of the resultant dry polymer product, of a mixture of a rosin acid selected from the group consisting of pimaric acid, abietic acid, isomers of abietic acid and mixtures thereof, and a fatty acid having about 18 carbon atoms, said mixture containing about 25% by weight of said rosin acid, whereby to improve the resistance to discoloration on aging while maintaining a desired average size of said crumbs, and subsequently rapidly mixing the solution with a hot aqueous medium to effect volatilisation of the organic solvent and formation of the said slurry.

References Cited by the Examiner
UNITED STATES PATENTS

| | | | |
|---|---|---|---|
| 2,839,483 | 6/1958 | Howland et al. | 260—822 |
| 2,893,982 | 7/1959 | Campbell | 260—94.7 |
| 2,953,556 | 9/1960 | Wolfe et al. | 260—94.7 |
| 3,009,891 | 11/1961 | Cooper | 260—94.7 |
| 3,015,642 | 1/1962 | Bawn et al. | 260—29.7 |

OTHER REFERENCES

Noller: "Chemistry of Organic Compounds," (1952), p. 146.

DONALD E. CZAJA, *Primary Examiner.*

LEON J. BERCOVITZ, *Examiner.*

J. J. KLOCKO, *Assistant Examiner.*

UNITED STATES PATENT OFFICE
CERTIFICATE OF CORRECTION

Patent No. 3,287,301                                    November 22, 1966

Frederick L. Fysh et al.

It is hereby certified that error appears in the above numbered patent requiring correction and that the said Letters Patent should read as corrected below.

Column 2, line 4, for "steretochemical" read -- stereochemical --; line 8, for "catalyst" read -- catalysts --; line 67, for "an" read -- the --; line 68, for "stream" read -- steam --; column 5, line 71, for "is" read -- it --; columns 11 and 12, TABLE II, third column last line thereof, for ".32" read -- 3.2 --; same table, footnote 4 thereof, strike out "Min.".

Signed and sealed this 12th day of September 1967.

(SEAL)
Attest:

ERNEST W. SWIDER                                    EDWARD J. BRENNER
Attesting Officer                                        Commissioner of Patents